Patented Sept. 4, 1923.

1,467,193

UNITED STATES PATENT OFFICE.

PERCY PARRISH, OF LONDON, ENGLAND, ASSIGNOR TO HIMSELF AND SOUTH METROPOLITAN GAS COMPANY, OF LONDON, ENGLAND.

MANUFACTURE OF AMMONIUM SULPHATE.

No Drawing. Application filed January 25, 1921. Serial No. 439,833.

*To all whom it may concern:*

Be it known that I, PERCY PARRISH, a subject of the King of Great Britain, residing in London, England, have invented a certain new and useful Improvement Relating to the Manufacture of Ammonium Sulphate, of which the following is a specification.

When it is required to make neutral ammonium sulphate by neutralizing the crystals removed from the saturator, it is desirable that the liquor in the saturator should be maintained at a low degree of acidity. On the other hand, in certain cases, more particularly in coke-oven by-product recovery plants, it is desirable to maintain this acidity at a considerably higher degree than that referred to above in order to avoid the production of coloured compounds from the cyanogen compounds in the gases entering the saturator, and consequent discoloration of the ammonium sulphate.

By this invention it becomes possible to work the saturator in conjunction with an ammonia still at the low degree of acidity desirable for making neutral sulphate, without fear of discoloration of the sulphate.

For this purpose the cyanogen compounds are converted into sulphocyanide by adding a sufficient quantity of ammonia polysulphide into the liquid destined for the still.

For instance, when the saturator is used in conjunction with an ammonia still ammonium polysulphide may be introduced into the liquid destined for the still, in quantity sufficient to convert into sulphocyanide the cyanide present in the liquor.

There are other methods which are equivalent to the addition of polysulphide; for instance, the addition of finely subdivided sulphur or the passage of the vapours leaving the still through spent oxide contained in suitable vessels capable of alternate operation, or the formation of polysulphide in the liquor by blowing air or other gas containing oxygen or its equivalent through the liquor.

I claim:—

A process for making colourless ammonium sulphate from ammoniacal liquor containing cyanogen compounds which consists in distilling the ammoniacal liquor, fixing the cyanogen compounds in the liquor with a polysulphide and receiving the ammoniacal vapours free from cyanogen in sulphuric acid.

In testimony whereof I have signed my name to this specification.

PERCY PARRISH.